United States Patent
Kawai et al.

(10) Patent No.: US 9,045,371 B2
(45) Date of Patent: Jun. 2, 2015

(54) SILICON CARBIDE-BASED POROUS BODY

(75) Inventors: Masaaki Kawai, Aichi-prefecture (JP); Yoshio Kikuchi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1329 days.

(21) Appl. No.: 12/329,834

(22) Filed: Dec. 8, 2008

(65) Prior Publication Data

US 2009/0155527 A1 Jun. 18, 2009

(30) Foreign Application Priority Data

Dec. 13, 2007 (JP) ................................ 2007-322434

(51) Int. Cl.
*B32B 3/12* (2006.01)
*C04B 38/00* (2006.01)
*C04B 35/565* (2006.01)
*C04B 35/573* (2006.01)
*C04B 35/58* (2006.01)
*C04B 35/63* (2006.01)
*C04B 111/00* (2006.01)

(52) U.S. Cl.
CPC ..... *C04B 38/0006* (2013.01); *Y10T 428/24149* (2015.01); *Y10T 428/268* (2015.01); *C04B 35/565* (2013.01); *C04B 35/573* (2013.01); *C04B 35/58092* (2013.01); *C04B 35/6316* (2013.01); *C04B 2111/00793* (2013.01); *C04B 2235/3826* (2013.01); *C04B 2235/3891* (2013.01); *C04B 2235/404* (2013.01); *C04B 2235/428* (2013.01); *C04B 2235/5436* (2013.01); *C04B 2235/6021* (2013.01); *C04B 2235/606* (2013.01); *C04B 2235/80* (2013.01); *C04B 2235/9607* (2013.01)

(58) Field of Classification Search
USPC ............ 428/34.4, 116; 501/92; 264/628, 629, 264/630; 55/523
See application file for complete search history.

(56) References Cited

U.S. PATENT DOCUMENTS

| 4,777,152 | A | * | 10/1988 | Tsukada ........................ 501/80 |
| 5,069,697 | A | | 12/1991 | Hamaguchi et al. |
| 5,382,553 | A | * | 1/1995 | Petrovic ........................ 501/92 |
| 5,454,999 | A | * | 10/1995 | Jayashankar et al. ........... 419/32 |
| 2003/0021949 | A1 | | 1/2003 | Tomita et al. |
| 2004/0033893 | A1 | | 2/2004 | Tomita et al. |
| 2007/0032370 | A1 | * | 2/2007 | Weisensel et al. .............. 501/88 |

FOREIGN PATENT DOCUMENTS

| DE | 10 2004 016 872 A1 | 10/2004 |
| EP | 1 260 882 A2 | 11/2002 |
| EP | 1 340 735 A1 | 9/2003 |
| EP | 1 375 454 A1 | 1/2004 |
| JP | A-04-036975 | 2/1992 |
| JP | A-06-182228 | 7/1994 |
| JP | A-07-204431 | 8/1995 |
| JP | A-7-330462 | 12/1995 |
| JP | B2-2578176 | 2/1997 |
| JP | A-2002-154882 | 5/2002 |
| JP | A-2002-356383 | 12/2002 |
| JP | A-2006-151704 | 6/2006 |
| WO | WO 96/00125 A1 | 1/1996 |

OTHER PUBLICATIONS

European Search Report issued in Application No. 08 25 3963; Dated Sep. 14, 2010.
Jun. 8, 2012 European Office Action issued in European Application No. 08 253 963.6.
European Office Action dated May 14, 2014 from European Patent Application No. 08 253 963.6.

* cited by examiner

*Primary Examiner* — Mark Ruthkosky
*Assistant Examiner* — Daniel J Schleis
(74) *Attorney, Agent, or Firm* — Oliff PLC

(57) ABSTRACT

A silicon carbide-based porous body comprising a plurality of silicon carbide (SiC) particles as an aggregate and a binder which binds the silicon carbide particles to each other, wherein the content of the binder, i.e. [100×binder/(silicon carbide particles+binder)] is 5 to 70% by volume, the open pore ratio is 30 to 70%, and the binder contains at least one member selected from the group consisting of a Ti silicide, a Zr silicide, a Mo silicide and a W silicide, in an amount of at least 60% by volume of the total binder. The silicon carbide-based porous body can avoid excessive temperature elevation when it is used as a filter and the particulate matter (PM) captured thereby is burnt and removed.

19 Claims, No Drawings

SILICON CARBIDE-BASED POROUS BODY

BACKGROUND OF THE INVENTION AND RELATED ART

The present invention relates to a silicon carbide-based porous body. More particularly, the present invention relates to a silicon carbide-based porous body which can avoid excessive temperature elevation when it is used as a filter and the particulate matter (PM) captured thereby is burnt and removed.

There have been widely used a filter [a diesel particulate filter (a DPF)] for capture and removal of the particulate matter present in a dust-containing fluid (e.g. an exhaust gas emitted from a diesel engine), and a porous honeycomb structure as a catalyst carrier for loading of a catalyst component capable of purifying the harmful substance present in an exhaust gas. Also, it is known to use, as a constituent material for such a honeycomb structure, refractory particles such as silicon carbide (SiC) particles. There is disclosed, for example, a porous silicon carbide-based catalyst carrier of honeycomb structure, obtained by using, as a starting raw material, a silicon carbide powder having a particular specific surface area and a particular impurity content, forming it into an intended shape, drying the formed material and firing the dried formed material at a temperature range of 1,600 to 2,200° C. (see, for example, Patent Literature 1). There are also disclosed a porous honeycomb structure comprising refractory particles (an aggregate) (silicon carbide, in particular) and metal silicon (see, for example, Patent Literature 2) and a method for production thereof. There is further disclosed a DPF using cordierite as a constituent material for honeycomb structure (see, for example, Patent Literature 3).

Meanwhile, there is disclosed a filter for diesel engine exhaust gas, having a gas-incoming filter made of a ceramic of low thermal conductivity and a gas-outgoing filter made of a ceramic of high thermal conductivity, the two filters being connected lengthwise in a direction in which an exhaust gas enters into the gas-incoming filter (see, for example, Patent Literature 4).

Patent Literature 1: JP-A-1994-182228
Patent Literature 2: JP-A-2002-154882
Patent Literature 3: Japanese Patent No. 2578176
Patent Literature 4: JP-A-1995-204431

The particulate matter (PM) discharged from a diesel engine is captured by a DPF installed in the diesel engine. However, the captured PM need be burnt and removed when the amount of the PM has reached a certain level, because the capture of PM causes a rise in pressure loss. Since the exhaust gas discharged from a diesel engine is at a low temperature of not higher than 300° C., the DPF need be heated to burn the PM. Various methods have been investigated for DPF heating and, in recent years, there has been selected (employed) a method of burning unburnt hydrocarbons with an oxidation catalyst provided at the inlet portion of DPF to overheat the DPF inlet by the combustion heat, of the unburnt hydrocarbons. The silicon carbide-based porous body disclosed in the Patent Literature 1, produced by the sintering brought about by the recrystallization reaction of silicon carbide powder per se has had a problem that the porous body has a high thermal conductivity at low temperatures (about 200° C.), making large the amount of the unburnt hydrocarbons required before the PM reaches its combustion temperature and incurring inferior fuel consumption. The silicon carbide-based porous body disclosed in the Patent Literature 2, containing silicon carbide (an aggregate) and metal silicon, has had the same problem as above that the porous body has a high thermal conductivity at low temperatures (about 200° C.), making large the amount of the unburnt hydrocarbons required before the PM reaches its combustion temperature and incurring inferior fuel consumption; moreover, the porous body has a small heat capacity at high temperatures, causing excessive temperature elevation owing to the combustion heat of PM and posing a risk of loss by melting. Meanwhile, the cordierite DPF disclosed in the Patent Literature 3 has a low thermal conductivity at low temperatures and reaches the combustion temperature of PM with a smaller amount of unburnt hydrocarbons; however, it has a small heat capacity at high temperatures, causing excessive temperature elevation owing to the combustion heat of PM and posing a risk of loss by melting. Further, the filter for diesel engine exhaust gas, disclosed in the Patent Literature 4, having a gas-incoming filter made of a ceramic of low thermal conductivity and a gas-outgoing filter made of a ceramic of high thermal conductivity has a bonded structure and has had a risk of PM leakage at the bonded portion.

The present invention has been made in view of the above-mentioned problems, and aims at providing a silicon carbide-based porous body which can avoid excessive temperature elevation when it is used as a filter and the particulate matter (PM) captured thereby is burnt and removed.

SUMMARY OF THE INVENTION

In order to achieve the above aim, the present invention provides a silicon carbide-based porous body described below.

[1] A silicon carbide-based porous body comprising a plurality of silicon carbide (SiC) particles as an aggregate and a binder which binds the silicon carbide particles to each other, wherein the content of the binder, i.e. [100×binder/(silicon carbide particles+binder)] is 5 to 70% by volume, the open pore ratio is 30 to 70%, and the binder contains at least one member selected from the group consisting of a Ti silicide, a Zr silicide, a Mo silicide and a W silicide, in an amount of at least 60% by volume of the total binder.

[2] A silicon carbide-based porous body according to [1], which has an average pore diameter of 5 to 50 μm.

[3] A silicon carbide-based porous body according to [1] or [2], wherein the silicon carbide particles have an average particle diameter of 5 to 100 μm.

[4] A silicon carbide-based porous body according to any of [1] to [3], which has a thermal conductivity of 10 to 45 W/mK at 600° C.

[5] A silicon carbide-based porous body according to any of [1] to [4], wherein the binder contains 20% by volume or less of silicon (Si).

[6] A silicon carbide-based porous body according to [4] or [5], wherein the thermal conductivity at 600° C. is 75% or more of the thermal conductivity at 200° C.

[7] A silicon carbide-based porous body according to any of [1] to [6], which is a honeycomb structure having porous partition walls forming, by surrounding, a plurality of cells which act as a fluid passage.

[8] A method for producing a silicon carbide-based porous body, which comprises kneading a raw material to be formed, to prepare a puddle, wherein the raw material to be formed comprises silicon carbide particles, a binder raw material and a pore former, the binder raw material containing at least 60% by volume of a metal silicide raw material, the metal silicide raw material being (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b), the content of the binder raw material, i.e. [100×binder raw material/(silicon carbide particles+binder raw material)] being 5 to 70% by volume, and the content of the pore former, i.e. (100×pore former/raw material to be formed) being 25 to 85% by volume, forming the puddle to prepare a formed material, and firing the formed material to obtain a silicon carbide-based porous body.

In the silicon carbide-based porous body of the present invention, the binder contains at least one member selected from the group consisting of a Ti silicide, a Zr silicide, a Mo silicide and a W silicide, in an amount of at least 60% by volume of the binder total. Therefore, when the binder is at low temperatures, the thermal conductivity of the silicon carbide-based porous body at low temperatures is small, the amount of unburnt hydrocarbons generated before the PM reaches its combustion temperature, can be made small, and an improved fuel consumption is obtained; meanwhile, when the binder is at high temperatures, the reduction in the thermal conductivity of the silicon carbide-based porous body at high temperatures can be suppressed, the heat capacity is large, and the combustion heat of PM propagates quickly, whereby the excessive temperature elevation of the porous body can be suppressed and the risk of loss by melting can be made small.

DESCRIPTION OF THE PREFERRED EMBODIMENTS

Next, embodiments of the present invention are described in detail. However, the present invention is not restricted to the following embodiments, and it should be construed that appropriate design changes, improvements, etc. may be added thereto based on the ordinary knowledge possessed by those skilled in the art, as long as there is no deviation from the gist of the present invention.

(1) Silicon Carbide-Based Porous Body

An embodiment of the silicon carbide-based porous body of the present invention comprises a plurality of silicon carbide (SiC) particles as an aggregate and a binder which binds the silicon carbide particles to each other. The content of the binder, i.e. [100×binder/(silicon carbide particles+binder)] is 5 to 70% by volume, preferably 10 to 50% by volume, more preferably 15 to 40% by volume. A binder content of less than 5% by volume is not preferred because the silicon carbide particles can not be bound sufficiently to each other and the strength of the silicon carbide-based porous body obtained is low. A binder content of more than 60% by volume is not preferred because the porosity of the silicon carbide-based porous body obtained is low and the pressure loss thereof is high. The content of the binder, i.e. [100×binder/(silicon carbide particles+binder)] is a calculation value obtained by conducting X-ray diffraction measurement for a ground silicon carbide-based porous body.

The binder contains at least one member selected from the group consisting of a Ti (titanium) silicide, a Zr (zirconium) silicide, a Mo (molybdenum) silicide and a W (tungsten) silicide (hereinafter, the at lest one member is referred to as "metal silicide", in some cases), in an amount of at least 60% by volume of the binder total. When the content of the metal silicide in the binder total is in such a range and when the binder is at low temperatures, the thermal conductivity of the silicon carbide-based porous body at low temperatures is small, the amount of unburnt hydrocarbons generated before the PM reaches its combustion temperature, can be made small, and an improved fuel consumption is obtained; meanwhile, when the binder is at high temperatures, the reduction in the thermal conductivity of the silicon carbide-based porous body at high temperatures can be suppressed, the heat capacity is large, and the combustion heat of PM propagates quickly, whereby the excessive temperature elevation of the porous body can be suppressed and the risk of loss by melting can be made small. Here, the heat capacity per unit volume, of Ti silicide ($TiSi_2$) at 900 K is 3.6 $J/cm^3 \cdot K$, the heat capacity of Zr silicide ($ZrSi_2$) is 2.5 $J/cm^3 \cdot K$, the heat capacity of Mo silicide ($MoSi_2$) is 3.2 $J/cm^3 \cdot K$, and the heat capacity of W silicide ($WSi_2$) is 3.1 $J/cm^3 \cdot K$.

As to the heat capacity of the whole silicon carbide-based porous body, there is no restriction because the preferred range of the heat capacity differs depending upon the design of the filter to be produced. However, in a case containing the binder in an amount of 40%, the heat capacity of the whole porous body at 900 K is preferably 3.2 $J/cm^3 \cdot K$ or more. When the heat capacity of the whole silicon carbide-based porous body is in such a range, the silicon carbide-based porous body can avoid excessive temperature elevation when the particulate matter (PM) captured thereby is burnt and removed. When the heat capacity of the whole silicon carbide-based porous body is smaller than 3.2 J/K, the silicon carbide-based porous body may be unable to avoid excessive temperature elevation when the particulate matter (PM) captured thereby is burnt and removed. The heat capacity is a value calculated from a specific heat obtained by the DSC method and the density obtained using a dry automatic densitometer (Accupyc 1330, a product of Shimadzu Corporation).

The content of the metal silicide in the binder total is 60% by volume or more, preferably 75% by volume or more, more preferably 90% by volume or more, particularly preferably 100% by volume (that is, the binder total is made of a metal silicide). As the metal silicide, a Ti silicide is most preferred in view of the heat capacity. Incidentally, when the content of the metal silicide in the binder total is 100% by volume, the binder may contain impurities which may be present inevitably, and the content of the metal silicide is taken as 100% by volume even if the impurities are present inevitably. As the impurities which may be present inevitably in the binder, there can be mentioned silicon dioxide, etc. When the content of the metal silicide in the binder is less than 60% by volume, the binder has no sufficiently high heat capacity and the whole silicon carbide-based porous body has no high heat capacity; therefore, the silicon carbide-based porous body obtained is unable to avoid excessive temperature elevation when the particulate matter (PM) captured thereby is burnt and removed. When the binder total is made of a metal silicide, the heat capacity of the binder is high and the binder can have a melting point which is higher than the melting point (1,410° C.) of a silicon carbide-based porous body using silicon alone as the binder. Here, the melting point of Ti silicide ($TiSi_2$) is 1,500° C., the melting point of Zr silicide ($ZrSi_2$) is 1,620° C., the melting point of Mo silicide ($MoSi_2$) is 2,030° C., and the melting point of W silicide ($WSi_2$) is 2,160° C. The content of the metal silicide in the binder total is a value obtained by conducting X-ray diffraction measurement for a ground silicon carbide-based porous body and using the density measured by a dry automatic densitometer (Accupyc 1330, a product of Shimadzu Corporation) using a reagent of same chemical formula. The content of silicon (Si) in the binder, described below is a value also obtained by the same method.

As the component of the binder, other than the metal silicide, there can be mentioned silicon (Si), metal oxides, etc. When the binder contains silicon, the content of Si is preferably 20% by volume or less, of the binder total, more preferably 10% by volume or less, particularly preferably 5% by volume or less. When the silicon content exceeds 20% by volume, the heat capacity of the binder is not sufficiently high and the whole silicon carbide-based porous body has no high heat capacity; therefore, the silicon carbide-based porous body is unable to avoid excessive temperature elevation when the particulate matter (PM) captured thereby is burnt and removed. Incidentally, the heat capacity of silicon at 900 K is 2.1 $J/cm^3 \cdot K$. In order to allow the binder to have a high heat capacity, it is preferred that the binder contains no silicon.

The silicon carbide particles constituting the silicon carbide-based porous body of the present embodiment has an average particle diameter of preferably 5 to 100 μm. With such an average particle diameter, there is an advantage that a porosity and a pore diameter both preferable for the filter to be produced are easily obtained. An average particle diameter of less than 5 μm results in too small a pore diameter, and an average particle diameter of more than 100 μm results in too small a porosity. Too small a pore diameter tends to cause blocking by particulate matter (PM), and too small a porosity causes a rise in pressure loss. The average pore diameter of raw material is a value obtained by measurement based on JIS R 1629.

The silicon carbide-based porous body of the present embodiment has an open pore ratio of preferably 30 to 70%, more preferably 40 to 65%. When the open pore ratio is in such a range, there is an advantage that the porous body maintains a required strength and yet can show a small pressure loss. An open pore ratio of less than 30% is not preferred because it incurs an increased pressure loss, and an open pore ratio of more than 70% is not preferred because it results in a reduced strength and a reduced thermal conductivity. The open pore ratio is a value obtained by measurement by the Archimedes method.

The silicon carbide-based porous body of the present embodiment has an average pore diameter of preferably 5 to 50 μm, more preferably 7 to 35 μm. When the average pore diameter is in such a range, there is an advantage that particulate matter (PM) can be captured effectively. An average pore diameter of less than 5 μm is not preferred because blocking takes place easily owing to the particulate matter (PM) captured. An average pore diameter of more than 50 μm is not preferred because particulate matter (PM) may pass through the filter made of the porous body, without being captured. The average pore diameter is a value obtained by measurement using a mercury porosimeter.

The silicon carbide-based porous body of the present embodiment has a thermal conductivity at 600° C., of preferably 10~45 W/mK, more preferably 11~40 W/mK. When the thermal conductivity is in such a range, there is an advantage that the excessive temperature elevation when the particulate matter (PM) captured is burnt and removed, can be suppressed. A thermal conductivity of less than 10 W/mK is not preferred because it may incur excessive temperature elevation. The thermal conductivity is a value obtained by measurement based on JIS R 1611. Incidentally, thermal conductivity is defined as a product of heat capacity per unit volume and thermal diffusivity. It is known empirically that the temperature elevation of filter caused by the burning of particulate matter (PM) is influenced by the thermal conductivity of filter and that the influence of heat capacity is larger than that of thermal diffusivity.

In the silicon carbide-based porous body of the present embodiment, the thermal conductivity at 600° C. is preferably 75% or more of the thermal conductivity at 200° C., more preferably 80% or more, particularly preferably 100%. With a thermal conductivity of less than 75%, the amount of the unburnt hydrocarbons required before the PM reaches its combustion temperature, is large, resulting in inferior fuel consumption, or, the combustion temperature of PM causes excessive temperature elevation and the loss by melting may be incurred.

The silicon carbide-based porous body of the present embodiment is preferably a honeycomb structure having porous partition walls which form, by surrounding, a plurality of cells to act as a fluid passage. When the cell ends of the honeycomb structure are plugged in a predetermined pattern to produce a DPF, the DPF has a high heat capacity and can avoid excessive temperature elevation when the particulate matter (PM) captured thereby is burnt and removed.

When the silicon carbide-based porous body of the present invention is used as a honeycomb structure, there is no particular restriction as to the shape of the honeycomb structure. For example, the shape of the section perpendicular to the central axis of the columnar structure of the honeycomb structure, i.e. the shape of the honeycomb structure bottom includes a polygon (e.g. a tetragon), a circle, an oval, an oblong circle, a modified shape, etc. The size thereof is not particularly restricted; however, the length of the central axis direction is preferably about 70 to 500 mm. When the shape of honeycomb structure bottom is, for example, a, square, each side thereof is preferably about 30 to 100 mm. There is no particular restriction as to the cell shape of the honeycomb structure, i.e. the cell shape in the honeycomb structure section perpendicular to the honeycomb structure central axis direction (the direction in which each cell extends); and the cell shape includes, for example, a triangle, a tetragon, a hexagon, an octagon, a circle and a combination thereof. As the means for increasing the heat capacity of each plugged portion, there can be mentioned use of a plugging material of higher heat capacity and enlargement of the volume of each plugged portion. For example, by employing a combination of octagon cells and tetragon cells and plugging the tetragon cells at the gas inlet side and the octagon cells at the gas outlet side, the volume of the plugged portions at the gas outlet side becomes larger than the volume of the plugged portions at the gas inlet side. The thickness of each partition wall of the honeycomb structure is preferably 50 to 2,000 μm. A partition wall thickness of less than 50 μm may result in the reduced strength of the honeycomb structure, and a partition wall thickness of more than 2,000 μm may result in an increased pressure loss. The cell density of the honeycomb structure is not particularly restricted, but is preferably 0.9 to 311 cells/$cm^2$, more preferably 7.8 to 62 cells/$cm^2$.

When the honeycomb structure (which is the silicon carbide-based porous body) is used as a filter, the filter may be one obtained by using the honeycomb structure as a honeycomb segment and bonding a plurality of such honeycomb segments. In this case, the structure of the honeycomb segment is preferably the same as the above-mentioned preferred constitution of the honeycomb structure.

(2) Method for Producing of Silicon Carbide-Based Porous Body

The method for producing an embodiment of the silicon carbide-based porous body of the present invention comprises kneading a raw material to be formed, which contains silicon carbide particles, a binder raw material and a pore former, to prepare a puddle, forming the puddle into an intended shape to prepare a formed material, and firing the formed material to obtain a silicon carbide-based porous body. The binder raw material is converted, by firing, into a binder which binds the silicon carbide particles to each other. The binder raw material contains a metal silicide raw material in an amount of at least 60% by volume, and the metal silicide raw material is (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) "a mixture of (a) and (b)". The content of the binder raw material, i.e. [100×binder raw material/(silicon carbide particles+binder raw material)] is 5 to 70% by volume; and the content of the pore former, i.e. (100×pore former/raw material to be formed) is 25 to 85% by volume.

In the method for producing the silicon carbide-based porous body of the present embodiment, first, the raw material to be formed, containing silicon carbide particles, a binder raw material and a pore former is kneaded to prepare a puddle. The raw material to be formed is preferably prepared by mixing silicon carbide particles, a binder raw material, a pore former and, as necessary, other raw materials. The metal silicide raw material contained in the binder raw material is (a), (b) or (c), but is preferably (a). When (a) is used as the metal silicide raw material, the silicon powder and the at least one member selected from the group consisting of Ti, Zr, Mo and W react with each other during firing, to become a metal silicide and bind silicon carbide particles to each other. When (b) is used as the metal silicide raw material, Ti silicide and silicon (which may be contained in the binder) per se bind, during firing, silicon carbide particles to each other. When (c) is used as the metal silicide raw material, the silicon powder reacts, during firing, with the at least one member selected from the group consisting of Ti, Zr, Mo and W to become a metal silicide and this metal silicide binds silicon carbide particles to each other, together with the metal silicide of (b).

The binder raw material contained in the raw material to be formed may contain a component other than the metal silicide raw material. The metal silicide raw material is contained in an amount of at least 60% by volume of the binder raw material total, preferably at least 75% by volume, more preferably 100% by volume (that is, the binder raw material total is the metal silicide raw material). When the content of the metal silicide raw material in the binder raw material total is in such a range, the binder in the silicon carbide-based porous body obtained has a high heat capacity, making high the heat capacity of the whole silicon carbide-based porous body; accordingly, the silicon carbide-based porous body can avoid excessive temperature elevation when the particulate matter (PM) captured thereby is burnt and removed.

Here, the metal silicide raw material refers to a raw material which becomes a metal silicide by firing, and does no include any raw material which remains unreacted after firing. For example, when, in the above-mentioned (a), the silicon powder is contained in excess relative to the metal (e.g. Ti) and silicon remains even after firing for formation of metal silicide, the portion of the silicon powder, which becomes, in firing, a metal silicide by reaction with the metal (e.g. Ti), is a metal silicide raw material, but the balance of the silicon powder, which remains as silicon even after firing, is "a binder raw material other than metal silicide raw material". Thus, when silicon is contained as a binder raw material other than metal silicide raw material, the content of such silicon is preferably 20% by volume or less relative to the binder raw material total. Thereby, the reduction in the heat capacity of the binder in the silicon carbide-based porous body obtained can be prevented. As the binder raw material other than the metal silicide raw material, there can be mentioned metal oxides, etc., besides silicon.

The content of the binder raw material in the raw material to be formed, i.e. [100×binder raw material/(silicon carbide particles+binder raw material)] is 5 to 70% by volume, preferably 10 to 60% by volume, more preferably 15 to 50% by volume. When the content of the binder is in such a range, there is an advantage that both binding strength and heat resistance can be satisfied.

The content of the pore former in the raw material to be formed, i.e. (100×pore former/raw material to be formed) is preferably 25 to 85% by volume. When the content of the pore former is in such a range, the open pore ratio of the silicon carbide-based porous body obtained can be controlled at 30 to 70%. When the content of the pore former is less than 25% by volume, the silicon carbide-based porous body obtained has a low open pore ratio and, when the content is more than 85% by volume, the silicon carbide-based porous body obtained has a high open pore ratio, which may result in a low strength. The pore former may be such a substance that vaporizes and disappears in the firing step. There can be used, singly or in combination, inorganic substances such as coke and the like, and organic substances such as high-molecular compound (e.g. foamed resin), starch and the like.

In the raw material to be formed may be compounded, as other raw materials, a forming aid, a surfactant, a dispersant, etc.

As the forming aid, there can be used organic forming aids such as hydroxypropyl methyl cellulose, methyl cellulose, hydroxyethyl cellulose, carboxymethyl cellulose, polyvinyl alcohol and the like. Inorganic forming aids such as montmorillonite and the like can also be used. These forming aids may be used singly or in combination of two or more kinds. The content of the forming aid is preferably 1 to 20% by mass relative to the total raw material to be formed.

Water is used as the dispersant. The content of the dispersant is preferably 25 to 45% by mass relative to the total raw material to be formed.

As the surfactant, there can be used ethylene glycol, dextrin, fatty acid soap, polyalcohol, etc. These may be used singly or in combination of two or more kinds. The content of the surfactant is preferably 0.1 to 5% by mass relative to the total raw material to be formed.

Next, the raw material to be formed is kneaded to prepare a puddle. There is no particular restriction as to the method for kneading the raw material to be formed, to prepare a puddle, and there can be mentioned, for example, a method using a kneader, a vacuum pug mill, or the like.

Then, the puddle is formed to prepare a formed material. As to the method for forming the puddle to prepare a formed material, there is no particular restriction, and there can be used a known forming method such as extrusion, injection, pressing or the like. When there is produced a honeycomb structure having porous partition walls which form, by surrounding, a plurality of cells, a preferred method therefor includes, for example, a method of extruding a raw material to be formed, by use of a die having a desired cell shape, a desired partition wall thickness and a desired cell density, to prepare a honeycomb formed material. When there is produced a DPF, it is preferred to plug the ends of predetermined cells at one end face of a honeycomb formed material and the ends of residual cells at other end face. The method for plugging cell ends is not restricted particularly and a known method can be used.

The formed material obtained is preferably dried prior to firing. The method for drying is not restricted particularly, and there can be used a known drying method such as hot-air drying, microwave drying, dielectric drying, reduced pressure drying, vacuum drying, freeze-drying or the like. Of these, a combined drying method of hot-air drying and microwave drying or dielectric drying is preferred because it enables rapid and uniform drying of whole formed material. The conditions of hot-air drying are preferably 80 to 150° C. and 5 minutes to 2 hours.

Next, the formed material is fired to produce a silicon carbide-based porous body of the present invention. As to the method for firing, there is no particular restriction, and firing can be conducted using an electric furnace, a gas furnace or the like. The conditions of firing are preferably 1,400 to 2,200° C. and 1 to 5 hours in an inert atmosphere such as nitrogen, argon or the like.

EXAMPLES

The present invention is described below more specifically by way of Examples. However, the present invention is in no way restricted by these Examples.

Example 1

There were mixed 100 parts by mass of a SiC powder (silicon carbide particles) having an average particle diameter of 35 μm, 25 parts by mass of a metal Si powder and 21 parts by mass of a metal Ti powder. To 100 parts by mass of the resulting powder were added 10 parts by mass of starch and a foamed resin as a pore former, 6 parts by mass of methyl cellulose as an organic forming aid, 2.5 parts by mass of a surfactant and 24 parts by mass of water, followed by kneading using a kneader to prepare a plastic puddle. Incidentally, the average particle diameter of the SiC powder was measured based on JIS R 1629, using a particle size distribution tester of laser diffraction type produced by Shimadzu Corporation.

The puddle was subjected to forming using an extruder. The extrudate was subjected to microwave drying, followed by drying at 150° C. for 2 hours using a hot-air dryer to obtain a honeycomb formed material having a partition wall thickness of 310 μm, a cell density of about 46.5 cells/cm$^2$ (300 cells/in.$^2$), a square sectional shape of 35 mm×35 mm and a length of 152 mm.

For the honeycomb formed material obtained, either end of each cell was plugged so that cells were plugged alternately at each end face of the formed material and each end face looked checkerwise. As the filler for plugging, the same material as used for the honeycomb formed material was used.

The plugged honeycomb formed material was dried at 150° C. for 2 hours using a hot-air dryer, then subjected to organic substance removal at about 450° C. for 5 hours in the air using an air furnace with a deodoring unit, and fired at about 1,450° C. for 2 hours in an Ar inert atmosphere to obtain a plugged porous honeycomb structure (a silicon carbide-based porous body) in which SiC crystal grains were bound by TiSi$_2$.

The plugged honeycomb structure (silicon carbide-based porous body) obtained was confirmed for temperature increase during burning of particulate matter (soot), by a method described later (a temperature confirmation test). The result obtained is shown in Table 1.

The silicon carbide-based porous body obtained was also measured for component ratio of silicon carbide particles and binder, open pore ratio, average pore diameter and thermal conductivity, according to the following methods. The results obtained are shown in Table 1. The content of metal silicide in binder (metal silicide content) was 100% by volume.

TABLE 1

|  | Binder content (vol. %) | Silicon content in binder (vol. %) | Metal silicide | Silicide content in binder (vol. %) | Open pore ratio (%) | Pore diameter (μm) | Thermal conductivity (W/mK) | Temperature confirmation test |
|---|---|---|---|---|---|---|---|---|
| Example 1 | 25 | 0 | TiSi$_2$ | 100 | 50 | 9 | 13 | ○ |
| Example 2 | 25 | 20 | TiSi$_2$ | 80 | 50 | 9 | 14 | ○ |
| Example 3 | 25 | 0 | MoSi$_2$ | 100 | 50 | 9 | 11 | ○ |
| Example 4 | 25 | 0 | ZrSi$_2$ | 100 | 50 | 9 | 10 | Δ |
| Example 5 | 25 | 0 | WSi$_2$ | 100 | 50 | 9 | 10 | Δ |
| Example 6 | 70 | 0 | TiSi$_2$ | 100 | 30 | 10 | 14 | ○ |
| Example 7 | 5 | 0 | TiSi$_2$ | 100 | 50 | 9 | 13 | ○ |
| Example 8 | 25 | 20 | TiSi$_2$ | 80 | 50 | 9 | 13 | ○ |
| Example 9 | 60 | 20 | TiSi$_2$ | 80 | 45 | 9 | 35 | Δ |
| Example 10 | 25 | 20 | TiSi$_2$ | 80 | 50 | 9 | 12 | ○ |
| Example 11 | 25 | 20 | TiSi$_2$ | 60 | 50 | 9 | 10 | Δ |
| Example 12 | 25 | 0 | TiSi$_2$ | 100 | 70 | 11 | 10 | Δ |
| Example 13 | 25 | 30 | TiSi$_2$ | 70 | 50 | 9 | 14 | Δ |
| Example 14 | 38 | 0 | TiSi$_2$ | 100 | 60 | 5 | 13 | ○ |
| Example 15 | 20 | 0 | TiSi$_2$ | 100 | 34 | 50 | 15 | ○ |
| Comparative Example 1 | 25 | 100 | No used | 0 | 50 | 9 | 13 | X |
| Comparative Example 2 | 2 | 0 | TiSi$_2$ | 100 | — | — | — | — |
| Comparative Example 3 | 90 | 0 | TiSi$_2$ | 100 | 28 | 4 | 52 | — |
| Comparative Example 4 | 25 | 20 | TiSi$_2$ | 30 | 50 | 9 | 7 | X |
| Comparative Example 5 | 25 | 0 | TiSi$_2$ | 100 | 80 | 15 | 8 | X |

(Confirmation Test for Temperature Increase During Burning (Temperature Confirmation Test))

Using the above-obtained honeycomb structure as a honeycomb segment, a plurality of such honeycomb segments were bonded with a bonding material (made of the same material as used for each honeycomb segment but having a lower viscosity). The bonded honeycomb segments were dried at 150° C. for 2 hours using a hot-air dryer, then subjected to a heat treatment at 700° C. for 1 hour in a nitrogen atmosphere, and processed to obtain a columnar honeycomb structure of 144 mm (diameter) and 153 mm (height). Round the outer surface of this plugged honeycomb structure was wound a ceramic-made, non-expanding mat as a holding material. The mat-wound honeycomb structure was forced into a canning case made of SUS 409, to prepare a canned structure. Into the canned structure was introduced a particulate (including soot)-containing combustion gas generated by combustion of a diesel gas oil; the combustion gas was allowed to enter from one end face (exhaust gas-incoming end face) of the honeycomb structure and discharge from the opposite end face (exhaust gas-leaving end face); thereby, particulate was captured inside the honeycomb structure. Then, the honeycomb structure was cooled to room temperature; thereafter, a combustion gas of 700° C. containing a certain proportion of oxygen was allowed to enter from the exhaust gas-incoming end face of the honeycomb structure to burn the soot, and the temperature of the center of the gas-leaving end face was measured using a thermocouple (hereinafter, this temperature is referred to as measured temperature). The result of the measurement was rated as follows. The maximum temperature of the center of gas-leaving end face of honeycomb structure when the honeycomb structure of Comparative Example 1 (the binder was made of silicon alone) was subjected to the temperature confirmation test, was taken as reference temperature; and a temperature difference when the measured temperature was compared with the reference temperature, i.e. (the measured temperature—the reference temperature) was calculated. A case of a temperature difference of larger than "−5° C." was rated as "X", a case of a temperature difference of "−5 to −30° C." was rated as "Δ", and a case of a temperature difference of "smaller than −30° C." was rated as "○". "Δ" and "○" were taken as pass. Incidentally, the maximum temperature of the gas-leaving end face of the silicon carbide-based porous body of Comparative Example 1 is itself too high as the temperature generated in soot burning; therefore, the silicon carbide-based porous body of Comparative Example 1 was rated as fail ("X") in the temperature confirmation test.

(Component Ratio of Silicon Carbide Particles and Binder)

A test piece of arbitrary shape was cut out from a honeycomb structure, ground, and subjected to quantitative identification of components (silicon carbide particles and binder) by XRD measurement (X-ray diffraction measurement). The calibration curves for identification were prepared for each binder component (a reagent was used) using a SiC raw material powder as a standard. Specifically explaining, the SiC raw material powder and a binder component were mixed at volume ratios of 90:10, 75:25, 50:50, 25:75 and 10:90. Each mixture was ground to obtain each powder. Each powder was subjected to XRD measurement, whereby a calibration curve for the binder was prepared. The measurement was conducted for each binder component. The ratio of each binder component was quantitatively determined using the corresponding calibration curve and, in converting the ratio to a volume ratio, there was used the density of the powder used in calibration curve preparation, measured by a dry automatic densitometer (Accupyc 1330, produced by Shimadzu Corporation). In the XRD measurement, there was used RINT-2500 (trade name, produced by Rigaku Sha). Binder content (volume %) was calculated from "100×binder/(silicon carbide particles+binder)"; metal silicide content (volume %) was calculated from "100×metal silicide/binder"; and silicon content (volume %) was calculated from "100×silicon/binder".

(Open Pore Ratio)

A test piece of arbitrary shape was cut out from a honeycomb structure and measured for open pore ratio by the Archimedes method.

(Average Pore Diameter)

A test piece of arbitrary shape was cut out from a honeycomb structure and measured for average pore diameter (pore diameter) using a mercury porosimeter.

(Thermal Conductivity)

A test piece was cut out from a honeycomb structure and measured for thermal conductivity based on JIS R 1611. Incidentally, each thermal conductivity shown in Table 1 is a thermal conductivity at 600° C.

Example 2

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 25 parts by mass of a metal Si powder and 17 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 80% by volume.

Example 3

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 24 parts by mass of a metal Si powder and 42 parts by mass of a metal Mo powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 4

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 20 parts by mass of a metal Si powder and 32 parts by mass of a metal Zr powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 5

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 23 parts by mass of a metal Si powder and 76 parts by mass of a metal W powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 6

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 174 parts by mass of a metal Si powder and 149 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 7

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 4 parts by mass of a metal Si powder and 3 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 8

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 25 parts by mass of a metal Si powder and 17 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 80% by volume.

Example 9

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 112 parts by mass of a metal Si powder and 76 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 80% by volume.

Example 10

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 5 parts by mass of a metal Si powder and 37 parts by mass of a metal TiSi$_2$ powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 80% by volume.

Example 11

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 20 parts by mass of a metal Si powder, 13 parts by mass of a metal Ti powder and 6 parts by mass (as solid content) of colloidal silica. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 60% by volume.

Example 12

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 25 parts by mass of a metal Si powder and 21 parts by mass of a metal Ti powder and that 100 parts of the resulting powder was mixed with 30 parts by mass of a pore former (starch and a foamed resin). The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 13

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 25 parts by mass of a metal Si powder and 15 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 70% by volume.

Example 14

A plugged porous honeycomb structure (a silicon carbide-based porous body) was obtained in the same manner as in Example 1 except that 100 parts by mass of a SiC powder (silicon carbide particles) consisting of 25 parts by mass of a SiC powder (silicon carbide particles) having an average particle diameter of 35 μm, 60 parts by mass of a SiC powder (silicon carbide particles) having an average particle diameter of 10 μm and 15 parts by mass of a SiC powder (silicon carbide particles) having an average particle diameter of 5 μm was mixed with 46 parts by mass of a metal Si powder and 39 parts by mass of a metal Ti powder and that no pore former was added. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Example 15

A plugged porous honeycomb structure (a silicon carbide-based porous body) was obtained in the same manner as in Example 1 except that 100 parts by mass of a SiC powder (silicon carbide particles) consisting of 10 parts by mass of a SiC powder (silicon carbide particles) having an average particle diameter of 35 μm and 90 parts by mass of a SiC powder (silicon carbide particles) having an average particle diameter of 100 μm was mixed with 19 parts by mass of a metal Si powder and 16 parts by mass of a metal Ti powder and that 100 parts by mass of the resulting powder was mixed with 20 parts by mass of a pore former (starch and a foamed resin). The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

Comparative Example 1

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 24 parts by mass of a metal Si powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 0% by volume.

Comparative Example 2

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 2 parts by mass of a metal Si powder and 1 part by mass of a metal Ti powder. The component ratio of silicon carbide particles and binder, of the honeycomb structure is shown in Table 1. The content of metal silicide was 100% by volume. Incidentally, in Comparative Example 2, the content of binder was low at 2% by volume and the strength after firing was low; therefore, the honeycomb structure caused disintegration, making impossible the measurement of the properties.

Comparative Example 3

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 673 parts by mass of a metal Si powder and 574 parts by mass of a metal Ti powder. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume. Incidentally, in Comparative Example 3, the honeycomb structure had a small pore diameter and a small open pore ratio; therefore, the pressure loss was large and the combustion of soot was incomplete in the temperature confirmation test, making it impossible to obtain the data in the test.

Comparative Example 4

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 12 parts by mass of a metal Si powder, 6 parts by mass of a metal Ti powder and 14 parts by mass (as solid content) of colloidal silica. The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 30% by volume.

Comparative Example 5

A plugged porous honeycomb structure (a silicon carbide-based porous body) was obtained in the same manner as in Example 1 except that 100 parts by mass of a SiC powder (silicon carbide particles) having an average particle diameter of 35 μm was mixed with 25 parts by mass of a metal Si powder and 21 parts by mass of a metal Ti powder and that 100 parts of the resulting powder was mixed with 40 parts by mass of a pore former (starch and a foamed resin). The honeycomb structure was subjected to temperature confirmation test and further measured for component ratio of silicon carbide particles and binder, open pore ratio, average pore diameter and thermal conductivity, according to the same methods as in Example 1. The results are shown in Table 1. The content of metal silicide was 100% by volume.

(Temperature Dependency of Thermal Conductivity)

In Example 1, there were measured thermal conductivities at soot burning temperatures of 200° C. and 600° C. to examine the reduction (%) of 600° C. thermal conductivity relative to 200° C. thermal conductivity. The result of Example 1 is shown in Table 2.

TABLE 2

|  | Open pore ratio (%) | Pore diameter (μm) | Thermal conductivity (W/mK) | | Reduction of thermal conductivity (%) |
|---|---|---|---|---|---|
|  |  |  | 200° C. | 600° C. |  |
| Example 1 | 50 | 9 | 16 | 13 | 19 |
| Comparative Example 1 | 50 | 9 | 18 | 13 | 28 |
| Comparative Example 6 | 42 | 9 | 42 | 29 | 31 |

Comparative Example 6

A porous plugged honeycomb structure (a recrystallized silicon carbide-based porous body) was obtained in the same manner as in Example 1 except that there were mixed 60 parts by mass of a SiC powder (silicon carbide particles) having an average particle diameter of 20 μm and 40 parts by mass of a SiC powder having an average particle diameter of 0.5 μm, thereto were added 5 parts by mass of methyl cellulose (as an organic forming aid) and 10 parts by mass of water, the resulting mixture was kneaded using a kneader to obtain a puddle, and firing was conducted at about 2,200° C. for 3 hours in an Ar inert atmosphere. The honeycomb structure was measured for open pore ratio, average pore diameter and thermal conductivities at 200° C. and 600° C., in the same manners as in Example 1. The results are shown in Table 2.

It is clear from Examples 1 to 15 and Comparative Example 1 to 6 that the temperature elevation during burning of soot, in silicon carbide-based porous body can be suppressed when, in the porous body, the content of binder is 5 to 70% by volume and the content of metal silicide in binder total is at least 60% by volume.

The silicon carbide-based porous body of the present invention can be suitably used as a filter for capture and removal of the particulate matter present in an exhaust gas from automobile or the like.

What is claimed is:

1. A silicon carbide-based porous body that is a honeycomb structure having porous partition walls forming a plurality of cells, which act as fluid passages, by surrounding the cells with the partition walls, the porous body comprises a plurality of silicon carbide (SiC) particles as an aggregate and a binder which binds the silicon carbide particles to each other, wherein
    the content of the binder relative to the total of the binder and the silicon carbide particles is 15 to 40% by volume,
    the open pore ratio is 30 to 70%, and
    the binder contains at least one metal disilicide in an amount of at least 80% by volume of total binder, any remainder of the total binder being made up of silicon, the at least one metal disilicide being selected from the group consisting of a Ti disilicide, a Zr disilicide, a Mo disilicide and a W disilicide.

2. A silicon carbide-based porous body according to claim 1, which has an average pore diameter of 5 to 50 μm.

3. A silicon carbide-based porous body according to claim 1, wherein the silicon carbide particles have an average particle diameter of 5 to 100 μm.

4. A silicon carbide-based porous body according to claim 2, wherein the silicon carbide particles have an average particle diameter of 5 to 100 μm.

5. A silicon carbide-based porous body according to claim 1, which has a thermal conductivity of 10 to 45 W/mK at 600° C.

6. A silicon carbide-based porous body according to claim 2, which has a thermal conductivity of 10 to 45 W/mK at 600° C.

7. A silicon carbide-based porous body according to claim 3, which has a thermal conductivity of 10 to 45 W/mK at 600° C.

8. A silicon carbide-based porous body according to claim 1, wherein the binder contains 10% by volume or less of silicon (Si).

9. A silicon carbide-based porous body according to claim 2, wherein the binder contains 10% by volume or less of silicon (Si).

10. A silicon carbide-based porous body according to claim wherein the binder contains 10% by volume or less of silicon (Si).

11. A silicon carbide-based porous body according to claim 5, wherein the thermal conductivity at 600° C. is 75% or more of the thermal conductivity at 200° C.

12. A silicon carbide-based porous body according to claim 8, wherein the thermal conductivity at 600° C. is 75% or more of the thermal conductivity at 200° C.

13. A method for producing a silicon carbide-based porous body according to claim 1, that is a honeycomb structure having porous partition walls forming a plurality of cells, which act as fluid passages, by surrounding the cells with the partition walls, the method comprises:
    kneading a raw material to be formed, to prepare a puddle, wherein the raw material to be formed comprises silicon carbide particles, a binder raw material and a pore former, the binder raw material containing at least 60% by volume of a metal silicide raw material, the metal silicide raw material being (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b), the content of the binder raw material relative to the total of the binder raw material and the silicon carbide particles is 15 to 50% by volume, and the content of the pore former relative to the material to be formed is 25 to 85% by volume,
    forming the puddle to prepare a formed material, and
    firing the formed material to obtain a silicon carbide-based porous body, the silicon carbide-based porous body comprises a plurality of silicon carbide (SiC) particles as an aggregate and a binder which binds the silicon carbide particles to each other, wherein the binder contains at least one metal disilicide in an amount of at least 80% by volume of total binder, any remainder of the total binder being made up of silicon, the at least one metal disilicide being selected from the group consisting of a Ti disilicide, a Zr disilicide, a Mo disilicide and a W disilicide, and wherein the content of the binder relative to the total of the binder and the silicon carbide particles is 15 to 40% by volume.

14. A silicon carbide-based porous body according to claim 1, wherein the honeycomb structure is fired at a temperature ranging from 1400° C. to 1450° C.

15. A silicon carbide-based porous body that is a honeycomb structure having porous partition walls forming a plurality of cells, which act as fluid passages, by surrounding the cells with the partition walls, the porous body comprises a plurality of silicon carbide (SiC) particles as an aggregate and a binder which binds the silicon carbide particles to each other, wherein
    the content of the binder relative to the total of the binder and the silicon carbide particles is 15 to 40% by volume,
    the open pore ratio is 30 to 70%,
    the binder contains at least one metal disilicide in an amount of at least 80% by volume of total binder, any remainder of the total binder being made up of silicon, the at least one metal disilicide being selected from the group consisting of a Ti disilicide, a Zr disilicide, a Mo disilicide and a W disilicide, and
    the silicon carbide-based porous body is obtained by firing the silicon carbide particles with a binder raw material.

16. A silicon carbide-based porous body according to claim 15, wherein the silicon carbide-based porous body is obtained by kneading a raw material to be formed to prepare a puddle, wherein the raw material to be formed comprises the silicon carbide particles, the binder raw material and a pore former, the binder raw material containing at least 60% by volume of a metal silicide raw material, the metal silicide raw material being (a) a mixture of a silicon powder and at least one member selected from the group consisting of Ti, Zr, Mo and W, (b) at least one member selected from the group consisting of a Ti silicide, a Zr silicide, a Mo silicide and a W silicide, or (c) a mixture of (a) and (b), the content of the binder raw material relative to the total of the binder raw material and the silicon carbide particles is 15 to 50% by volume, and the content of the pore former relative to the material to be formed is 25 to 85% by volume, forming the puddle to prepare a formed material, and performing the firing by firing the formed material.

17. A silicon carbide-based porous body according to claim 15, wherein the silicon carbide particles with the binder raw material is fired at a temperature ranging from 1400° C. to 1450° C.

18. A silicon carbide-based porous body according to claim 15, wherein the silicon carbide particles have an average particle diameter of 5 to 100 μm.

19. A silicon carbide-based porous body according to claim 15, wherein the thermal conductivity of the body at 600° C. is 75% or more of the thermal conductivity at 200° C.

\* \* \* \* \*